(12) United States Patent
Agrawal et al.

(10) Patent No.: US 10,009,401 B2
(45) Date of Patent: Jun. 26, 2018

(54) CALL CONTINUITY IN HIGH UPLINK INTERFERENCE STATE

(71) Applicant: QUALCOMM Incorporated, San Diego, CA (US)

(72) Inventors: Ambuj Agrawal, San Diego, CA (US); Navid Ehsan, San Diego, CA (US); Nagamanikandan Sivakumar, Telangana (IN); Saket Bathwal, Telangana (IN); Mohammed Al Khairy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 14/863,416

(22) Filed: Sep. 23, 2015

(65) Prior Publication Data

US 2017/0085615 A1   Mar. 23, 2017

(51) Int. Cl.
*H04L 29/06*   (2006.01)

(52) U.S. Cl.
CPC ........ *H04L 65/604* (2013.01); *H04L 65/1016* (2013.01); *H04L 65/607* (2013.01); *H04L 65/608* (2013.01); *H04L 69/04* (2013.01); *H04L 69/22* (2013.01)

(58) Field of Classification Search
CPC . H04L 65/604; H04L 65/1016; H04L 65/607; H04L 65/608; H04L 69/04; H04L 69/22
USPC ........................................................ 370/514
See application file for complete search history.

(56) References Cited

U.S. PATENT DOCUMENTS

| 7,558,247 B2 | 7/2009 | Lee et al. |
| 7,839,852 B2 | 11/2010 | Liu et al. |
| 8,027,328 B2 | 9/2011 | Yang et al. |
| 8,358,669 B2 | 1/2013 | Meylan et al. |
| 8,929,298 B2 | 1/2015 | Yi et al. |
| 2006/0187846 A1 | 8/2006 | Pelletier et al. |

(Continued)

OTHER PUBLICATIONS

"3rd Generation Partnership Project; Technical Specification Group Radio Access Network; Packet Data Convergence Protocol (PDCP) specification (Release 12)," 3GPP Standard; 3GPP TS 25.323, 3rd Generation Partnership Project (3GPP), Mobile Competence Centre; 650, Route Des Lucioles; F-06921 Sophia-Antipolis Cedex; France, vol. RAN WG2, No. V12.0.0, Sep. 23, 2014 (Sep. 23, 2014), pp. 1-43, XP050925655, [retrieved on Sep. 23, 2014].

(Continued)

*Primary Examiner* — Afsar M Qureshi
(74) *Attorney, Agent, or Firm* — Arent Fox LLP

(57) ABSTRACT

A method, an apparatus, and a computer program product for wireless communication are provided. The apparatus receives a stream of RTP data packets over a wireless channel and applies ROHC decompression to decode the packets. Upon a failure of ROHC decompression, the apparatus identifies the RTP sequence number (SN), RTP Timestamp (TS), and PDCP receive time (RT) of a prior successfully decoded packet, and the PDCP SN and PDCP RT of the failed packets. Using the identified information, the apparatus estimates the RTP SN and RTP TS of each of the failed packets. The apparatus decodes the packets using the estimated information.

56 Claims, 11 Drawing Sheets

(56) References Cited

U.S. PATENT DOCUMENTS

| | | | |
|---|---|---|---|
| 2007/0047547 A1* | 3/2007 | Conner | H04L 47/10 370/392 |
| 2010/0191858 A1* | 7/2010 | Thomas | H04L 65/4076 709/231 |
| 2010/0205497 A1* | 8/2010 | Li | H04L 69/04 714/746 |
| 2015/0264359 A1* | 9/2015 | Vanam | H04N 21/2343 375/240.27 |
| 2016/0241685 A1* | 8/2016 | Shah | H04L 69/04 |

OTHER PUBLICATIONS

International Search Report and Written Opinion—PCT/US2016/052246—ISA/EPO—dated Dec. 8, 2016.

Pelletier G., et al., "RObust Header Compression Version 2 (ROHCv2): Profiles for RTP, UDP, IP, ESP and UDP Lite; draft-ietf-rohc-rfc3095bis-rohcv2-profiles-06.txt," 5, JCT-VC Meeting; 96, MPEG Meeting; Mar. 16, 2011-Mar. 23, 2011; Geneva; (Joint Collaborative Team on Video Coding of ISO/IEC JTC1/SC29/WG11 and ITU-T SG.16 ); URL: http://wftp3.itu.int/av-arch/jctvc-site/,, vol. rohc, No. 6, Mar. 19, 2008 (Mar. 19, 2008), XP015053813, ISSN: 0000-0004 paragraph [06.6]—paragraph [06.9.

* cited by examiner

CALL CONTINUITY IN HIGH UPLINK INTERFERENCE STATE

BACKGROUND

Field

The present disclosure relates generally to communication systems, and more particularly, to techniques for increasing transmission quality.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Real-Time Transport Protocol (RTP) packets may be transmitted over wireless channels using Packet Data Convergence Protocol (PDCP). The data packets may be transmitted in a variety of modes. In the context of many applications where bandwidth demands dictate the quality of communications such as, for example, Voice-over-Long Term Evolution (VoLTE) calls and other applications involving the real-time transmission of multimedia data, repeated packet failures may significantly impact the user's experience. For example, a problem may occur in that the failed packets typically cannot be recognized and retransmitted in time to ensure a seamless transmission of data.

SUMMARY

In an aspect of the disclosure, a method, a computer program product, and an apparatus are provided. The apparatus includes a memory and at least one processor coupled to the memory and configured to receive a plurality of Real-time Transport (RTP) packets over a wireless channel, apply Robust Header Compression (ROHC) decompression to decode the received RTP packets wherein a decoding failure occurs for at least one of the packets, estimate at least one RTP parameter of the failed at least one packet based on a corresponding Packet Data Convergence Protocol (PDCP) parameter, and decode the failed at least one packet using the at least one RTP parameter.

The apparatus further includes means for receiving a plurality of Real-time Transport (RTP) packets on a wireless channel, means for applying Robust Header Compression (ROHC) decompression to decode the received RTP packets wherein a decoding failure occurs for at least one of the packets, means for estimating at least one RTP parameter of the failed at least one packet based on a corresponding Packet Data Convergence Protocol (PDCP) parameter, and means for decoding the failed at least one packet using the at least one RTP parameter.

In another aspect of the disclosure, a method for wireless communication includes receiving a plurality of Real-time Transport (RTP) packets over a wireless channel, applying Robust Header Compression (ROHC) decompression to decode the received RTP packets wherein a decoding failure occurs for at least one of the packets, estimating at least one RTP parameter of the failed at least one packet based on a corresponding Packet Data Convergence Protocol (PDCP) parameter, and decoding the failed at least one packet using the at least one RTP parameter.

In another aspect of the disclosure, a computer readable medium storing computer executable code for wireless communication includes code for receiving a plurality of Real-time Transport (RTP) packets over a wireless channel, applying Robust Header Compression (ROHC) decompression to decode the received RTP packets wherein a decoding failure occurs for at least one of the packets, estimating at least one RTP parameter of the failed at least one packet based on a corresponding Packet Data Convergence Protocol (PDCP) parameter, and decoding the failed at least one packet using the at least one RTP parameter.

DETAILED DESCRIPTION

Figure 1:
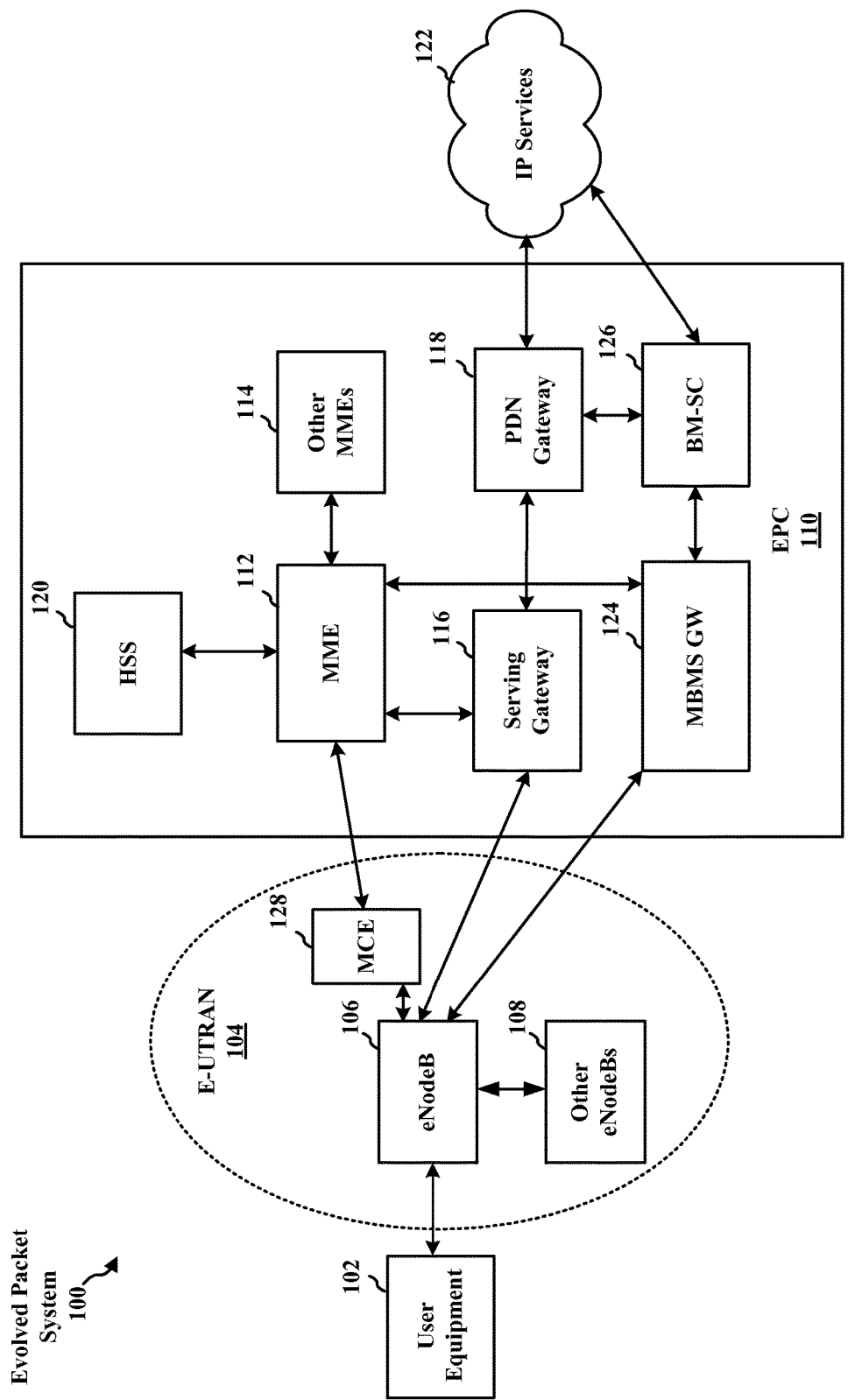
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
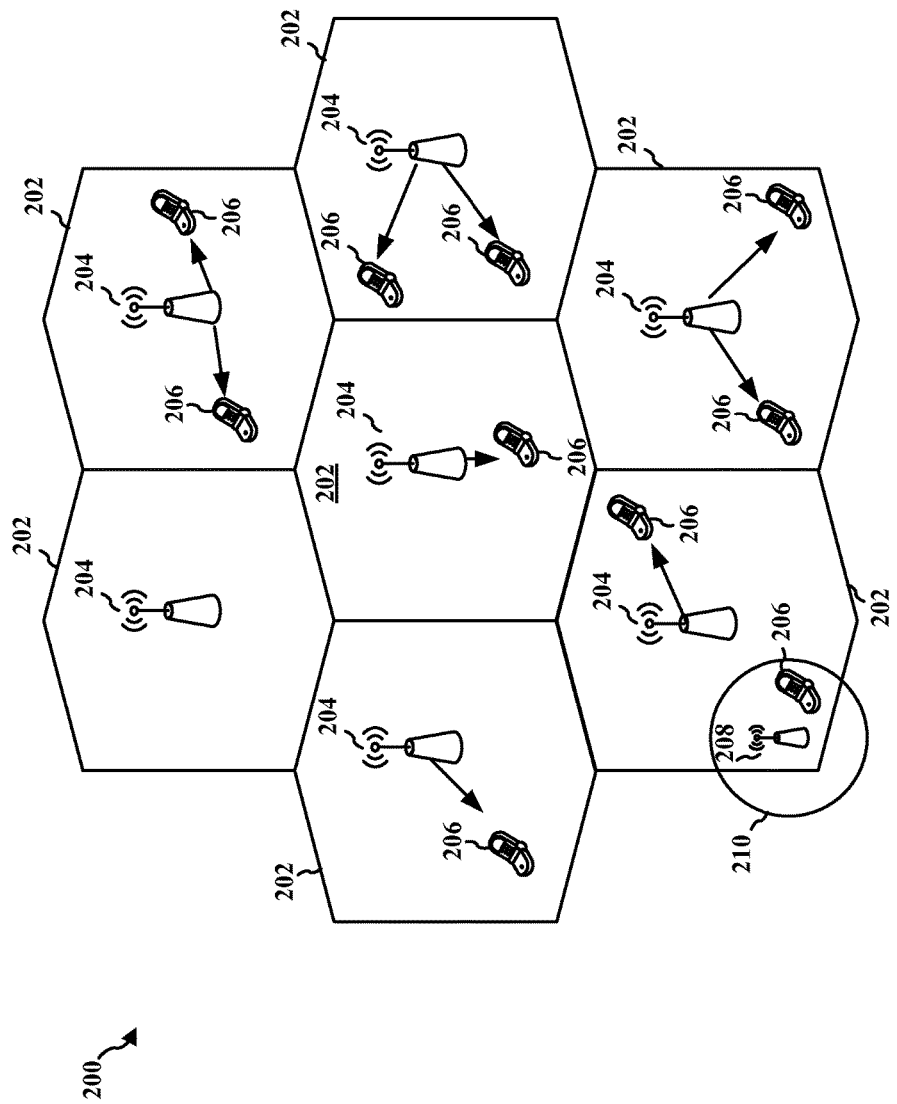
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
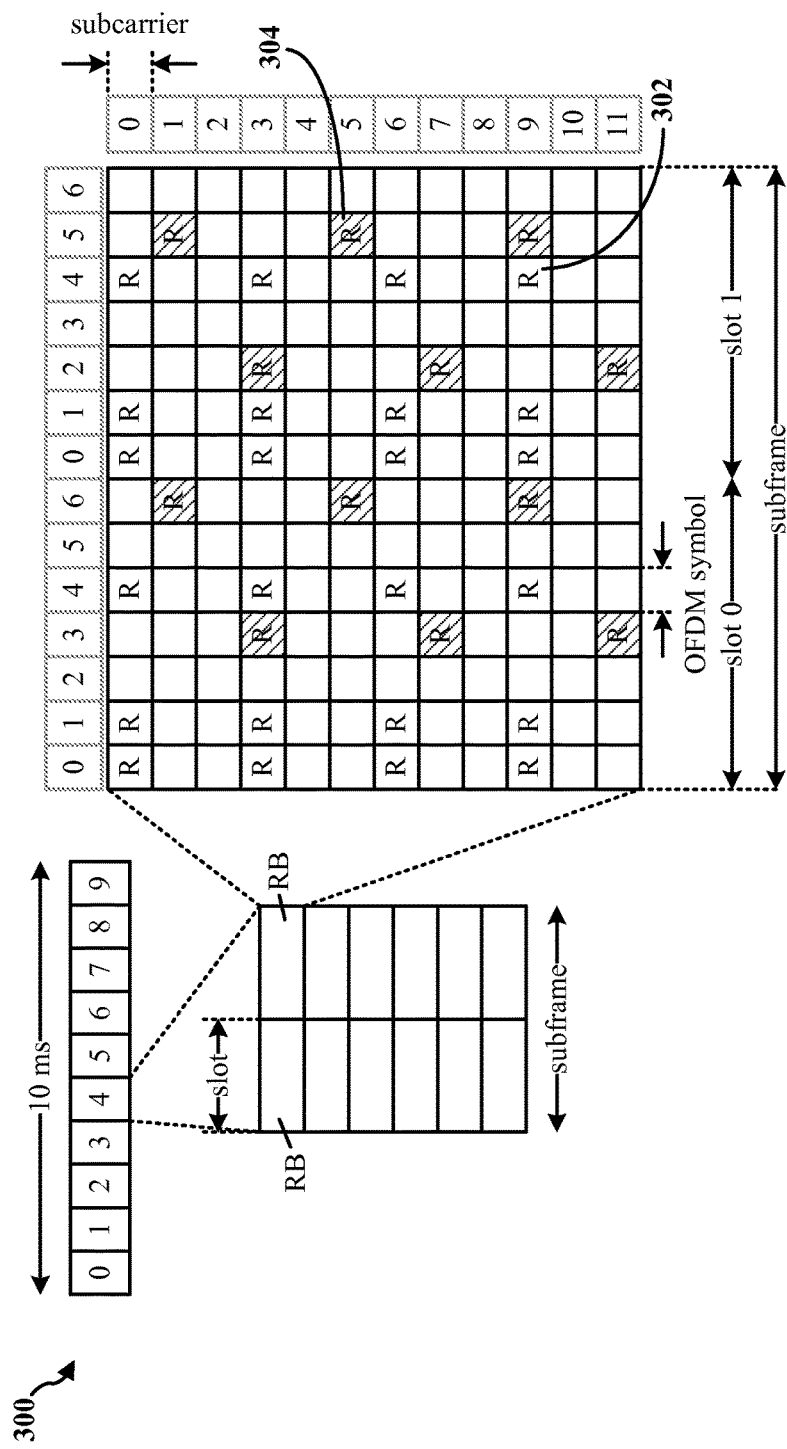
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
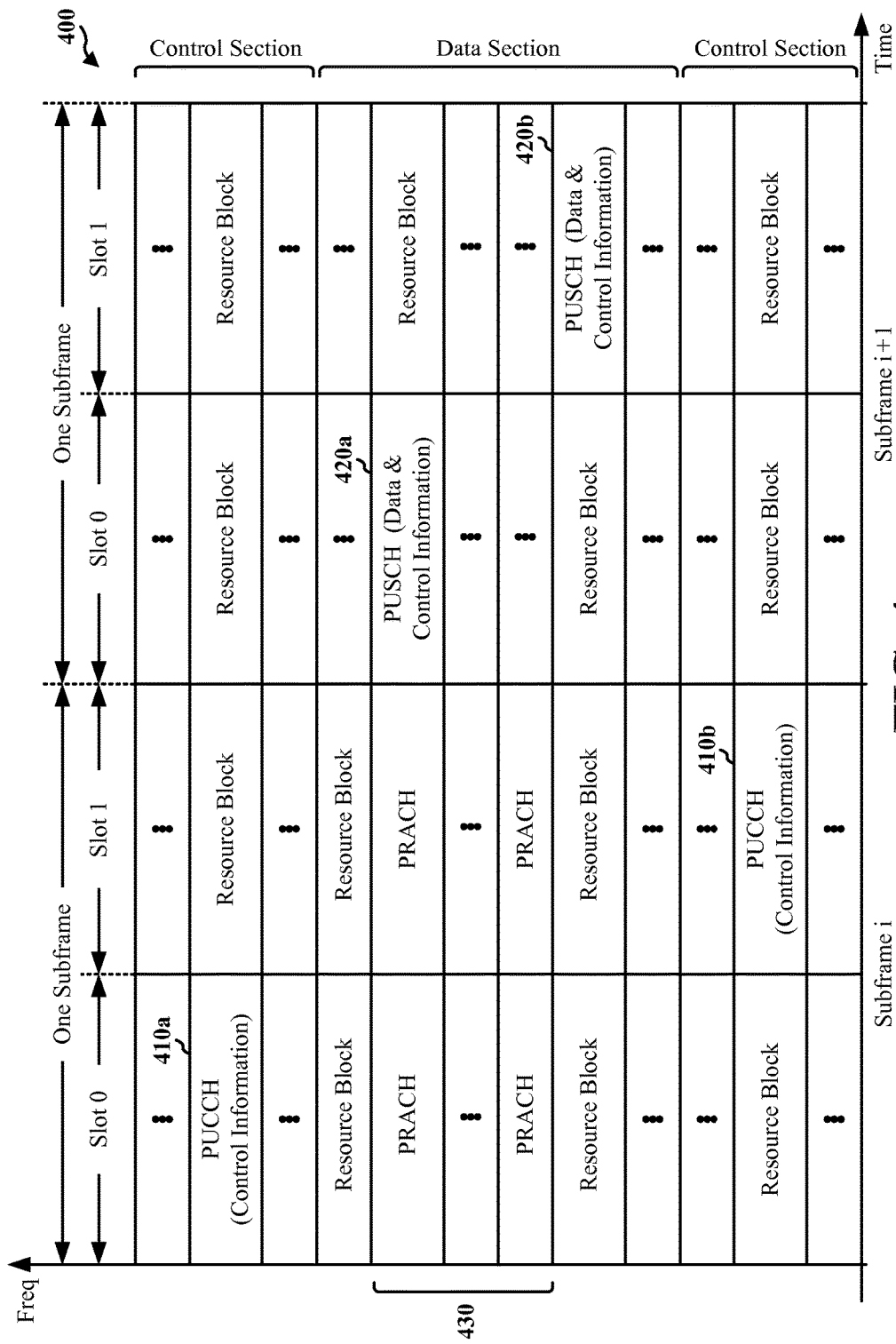
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
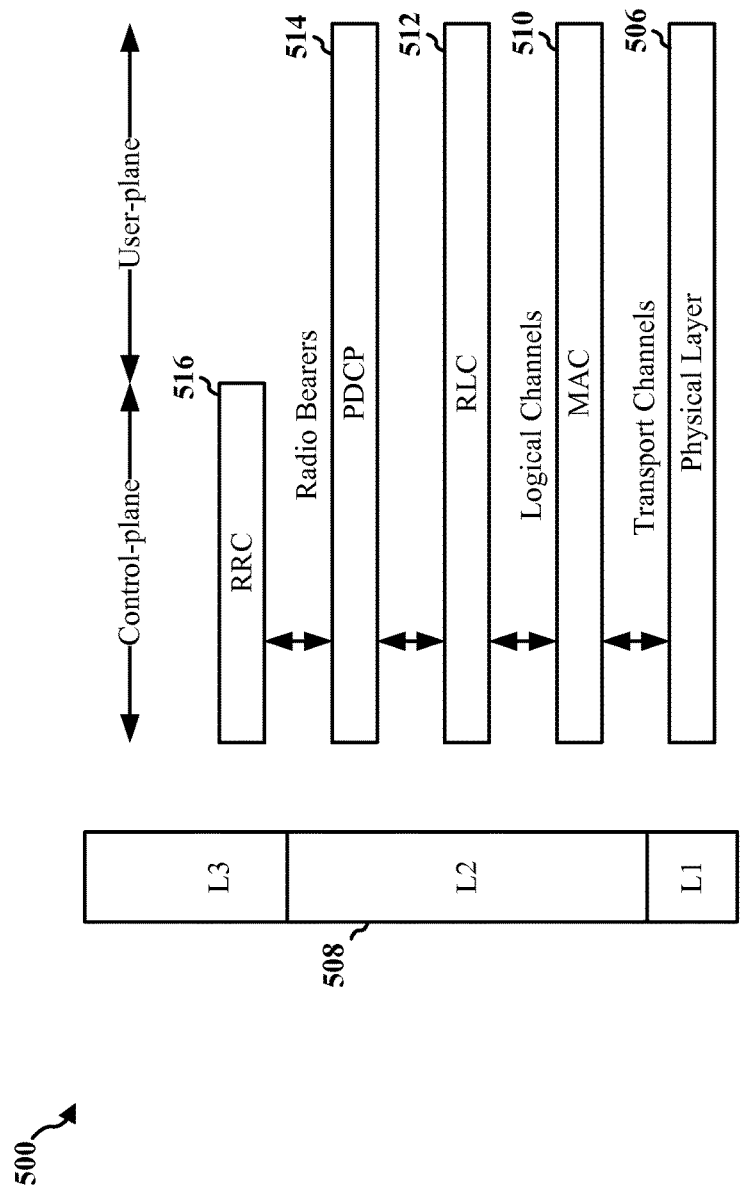
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
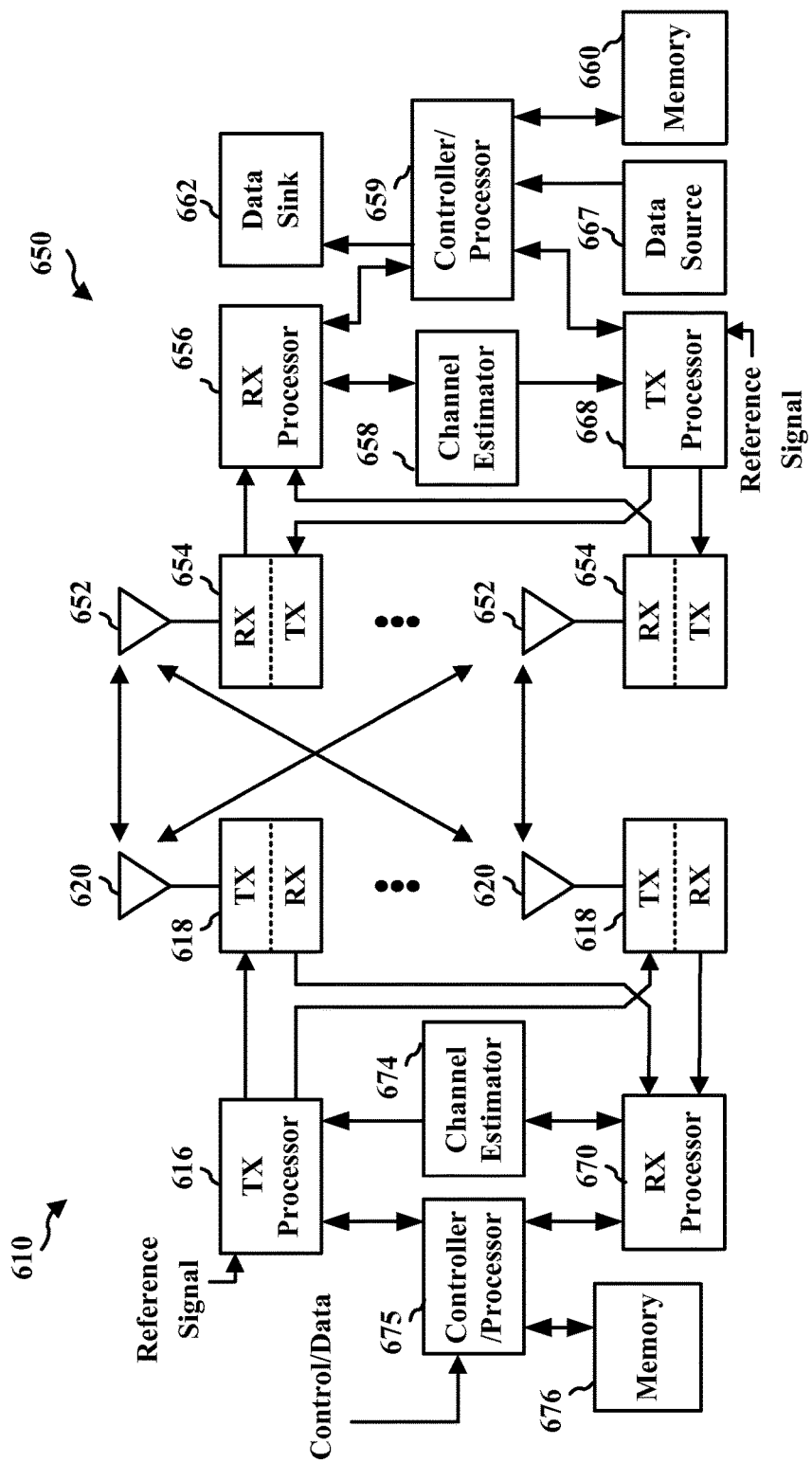
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The Real-Time Transport Protocol (RTP) is an IP standard that specifies the manner in which programs manage the real-time transmission of multimedia data over a network. RTP supports a variety of applications, including, for example, Internet telephony applications, video conferences with multiple, geographically dispersed participants, and the like. RTP combines its data transport capabilities with a control protocol (RTCP). This combination makes it possible to monitor data delivery for large multicast networks, which allows the receiver to detect failed packets. Both protocols work independently of the underlying Transport layer and Network layer protocols. RTP header information provides the receiver with information as to how to reconstruct the data and describes how the codec bit streams are packetized. Typically, RTP runs on top of the User Datagram Protocol (UDP), although it can use other transport protocols. The Session Initiation Protocol (SIP) and H.323 use RTP.

RTP components include a sequence number, which may be used to detect lost packets; a payload identification, which describes the specific media encoding type so that it can be changed to accommodate bandwidth variations; a frame indication, which specifies the beginning and end of each frame; a source identification, which identifies the originator of the frame; and intramedia synchronization, which uses timestamps to detect and compensate for delay jitter within a single stream.

Robust Header Compression (ROHC) is a standardized method to compress the IP, UDP, UDP-Lite, RTP, and TCP headers of Internet packets. ROHC compresses excess protocol headers before transmitting them on a link and uncompresses them to their original state on reception at the other end of the link. It is possible to compress the protocol headers due to the redundancy in header fields of the same packet as well as consecutive packets of the same packet stream.

ROHC is an extensible framework which includes Profile 1 or ROHC Real-time Transport Protocol (RTP). ROHC RTP is an efficient and robust compression scheme, able to compress the headers down to a total size of one octet. ROHC RTP compresses packets with IP/UDP/RTP protocol headers.

The RLC (Radio Link Control) layer is responsible for delivery of upper layer service data units (SDUs). RLC can work in 3 different modes, depending on the requirement of the data to be transported; Transparent Mode (TM), Unacknowledged Mode (UM) and Acknowledged Mode (AM). RLC is also responsible for reordering of RLC data PDUs (Only for UM and AM data transfer), duplicate detection (Only for UM and AM data transfer), RLC SDU discard (Only for UM and AM data transfer), RLC re-establishment, and protocol error detection (Only for AM data transfer). For a PDCP/Radio Link Control (RLC) unacknowledged mode (UM) in the context of RTP applications such as Voice-over-Long Term Evolution (VoLTE), no other application is generally sharing the same dedicated bearer with the RTP (VoLTE) packets.

Certain aspects of this disclosure will be discussed in the context of Voice over LTE (VoLTE). VoLTE is based on the IP Multimedia Subsystem (IMS) network. IMS is an architectural framework for delivering IP multimedia services. IMS enables a variety of services to be run seamlessly rather than having several disparate applications operating concurrently. This approach results in the voice service (control and media planes) being delivered as data flows within the LTE data bearer.

Figure 7:
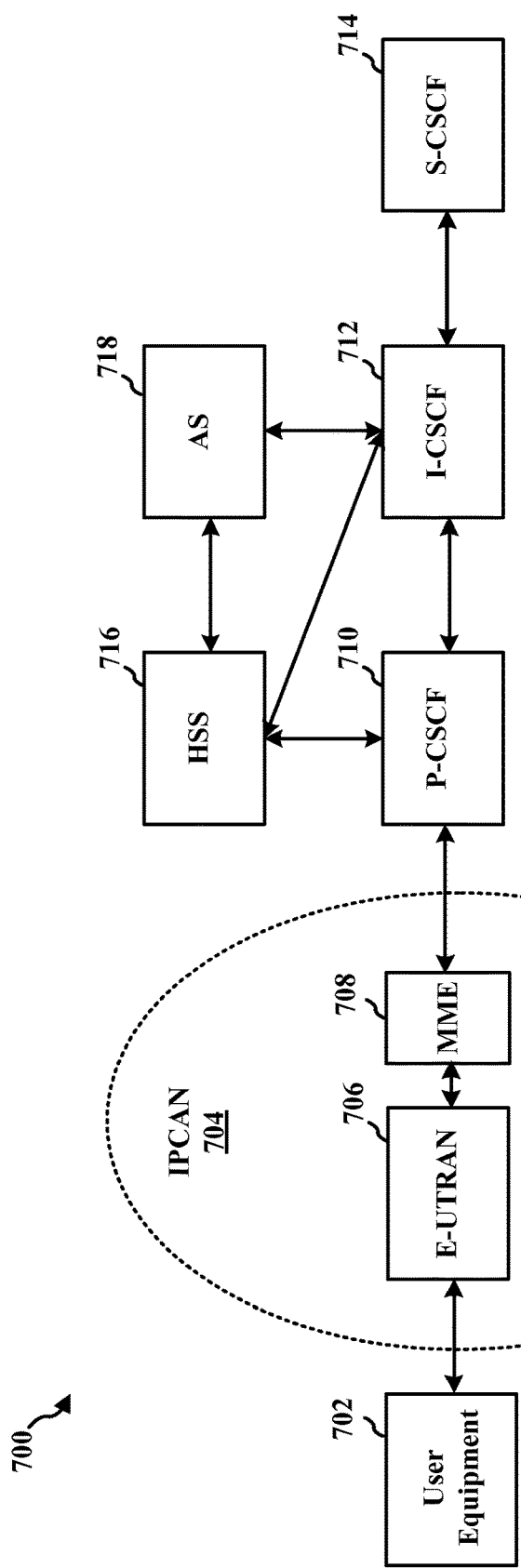
FIG. 7 is a diagram of an IMS network 700 identifying various components used in VoLTE.

FIG. 7 is a diagram of an IMS network 700 identifying various components used in VoLTE. User equipment 702 is connected to IP Connectivity Access Network (IPCAN) 704, which includes E-UTRAN 706 and MME 708. Proxy Call State Control Function (P-CSCF) 710 is the user to network proxy such that SIP signaling to and from the user runs via P-CSCF 710, whether in the home or a visited network. Interrogating Call State Control Function (I-CSCF) 712 is used for forwarding an initial SIP request to Serving Call State Control Function (S-CSCF) 714 when the initiator does not know which S-CSCF should receive the request. S-CSCF 714 undertakes a variety of actions within the overall system, and it has a number of interfaces to enable it to communicate with other entities within the system. AS 718 is the application server that handles the voice as an application. Home Subscriber Server (HSS) 716 is the main subscriber database used within IMS. The IMS HSS 716 provides details of the subscribers to the other entities within the IMS network 700, enabling users to be granted access depending on their status.

The IMS calls for VoLTE are processed by the subscriber's S-CSCF in the home network. The connection to S-CSCF 714 is via P-CSCF 710. Depending on the network in use and overall location within the IMS network 700, P-CSCF 710 will vary, and a key element in enabling voice calling capability is the discovery of P-CSCF 710.

An additional requirement for VoLTE enabled networks is to have a means to handing back to circuit switched legacy networks in a seamless manner, while only having one transmitting radio in the handset to preserve battery life. Single Radio Voice Call Continuity (SRVCC) may be used for this purpose. SRVCC enables Inter Radio Access Technology (RAT) handover as well as a handover from packet data to circuit switched data voice calls.

As an illustration of aspects of the disclosure, ROHC profile 1 is herein addressed. While ROHC profile 1 is discussed as an example, the configurations herein are not so limited and may be applicable to a wide variety of wireless protocols. For better performance, the packets are classified into streams before being compressed. Classified streams may be compressed according to a compression profile. ROHC profile 1 may be used in conjunction with RTP/UDP/IP. In this context, various packet types are used to provide various degrees of protection. UO0 packet type provides the maximum compression and is composed of three bytes. Two bytes are used for the UDP checksum and the remaining byte carries the four LSBs of the RTP sequence number (SN) and three bits for the cyclic redundancy check (CRC). Because four bits are used for carrying RTP SN, the receive window size is 16

In the event of a failure of RTP packets over a wireless channel, the ROHC decompressor at the UE 650 (FIG. 6) and the ROHC compressor at the network may lose synchronization. This may occur, for instance, when the ROHC packet received by the UE 650 from eNB 610 is for a SN that falls outside the receive window. In this event, the UE 650 may transmit negative ROHC feedback to the network. Nevertheless, subsequent packets received in the downlink channel will likely fail decompression until a context update packet (e.g., Initialization and Refresh (IR), IR-DYN, UOR2, etc.) is received from the network. In the example of a VoLTE call, the ROHC decompression failure typically has a direct negative impact on voice quality.

In an aspect of the disclosure, when ROHC decompression failure in the configuration illustrated above or in any applicable network implementation, a technique is disclosed for passing decompression by using information from the PDCP layer to maximize the likelihood of received packets passing decompression.

RTP packets in many applications are most often sent using PDCP/RLC UM mode, including VoLTE. In such implementations, no other application typically shares the same dedicated bearer with the RTP (VoLTE) packets.

Accordingly, when ROHC decompression failure occurs then the information from the PDCP layer can be used to increase the chances of passing decompression. The gap in PDCP SN corresponds directly to the gap in RTP SN. Also the value of RTP TimeStamp can be derived from the time gap between the received PDCP packets.

Generally, only RTP SN and RTP TimeStamp (TS) change between different ROHC packets over a wireless channel. For this reason, if the RTP SN and the RTP TS of a failed packet can be determined, then ROHC decompression will likely pass.

Furthermore, RTP SN generally follows the PDCP SN. Therefore, RTP SN can be determined based on the PDCP SN.

The RTP TS calculation is straightforward if the packet drop occurred during the same talk spurt. For example, the RTP TS jump is equal to (difference in RTP SN between two packets)×20 ms. The two packets may include, for example, a previous successfully decoded packet and the failed packet.

In the event there is a state transition between TALK and SILENCE at the RTP layer, the time difference between the two PDCP packets may still be used to estimate a RTP TS value denoted by $TS_{approx}$. If ROHC CRC fails with $TS_{approx}$, then iterative attempts to determine RTP TS may be used. For example, RTP TS=$TS_{approx}$+/−20 ms or RTP TS=TSapprox+/−40 ms may be used and so on until a threshold, wherein decompression is attempted using the various values until decompression passes or the threshold is reached.

There may be instances where PDCP SN rollover occurs or UE 650 is not able to calculate correct RTP TS value because of high jitter. In these situations, decompression would have failed in any event, so using the above-described technique is superior to enable decompression to pass in situations where these issues are not the primary influencers of packet loss.

Figure 8:
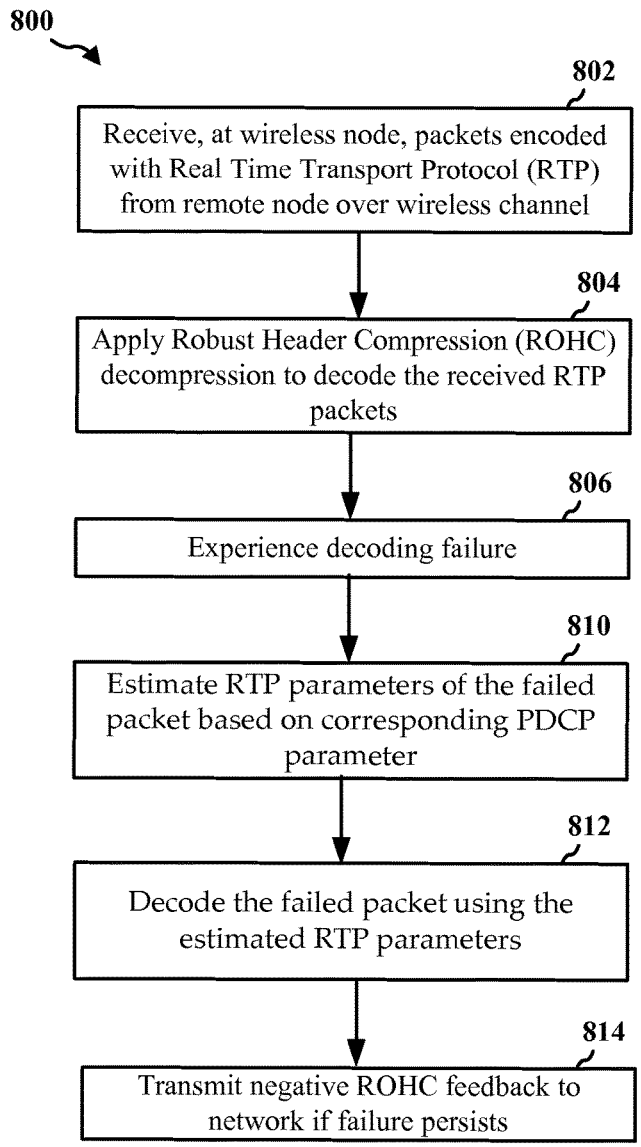
FIG. 8 is a flow chart of a method of wireless communication.

FIG. 8 is a flow chart of a method 800 of wireless communication. The method may be performed by a UE 650. At 802, the receiver at the wireless node receives RTP packets from a remote node (e.g., eNB 610) over a wireless downlink channel. The RTP packets may be received in conjunction with a VoLTE call or other real-time application. At 804, the receiver applies ROHC decompression to decode the incoming RTP packets. At 806, a decoding failure is experienced and ROHC decompression fails for one or more packets. At 810, the RTP parameters of the failed packets are determined based on the corresponding PDCP packets in a manner to be further described below. Then, at 812, the failed packets are decoded using ROHC decompression based on the estimated RTP parameters. If the failure continues for a maximum number of retries or a timer expires, then the UE may transmit negative ROHC feedback to the network, as in 814.

An illustration of the computation of the RTP parameters of failed packets will now be described. An exemplary log file representing the parameters of data packets received at a UE is shown below.

| 2014 Jun 13 05:58:13.242 [FB] 0x1362 RoHC Decompressor | |
|---|---|
| RoHC Instance = | 4237063872 |
| CID = | 0 |
| Profile = | 1 (RTP) |
| Mode = | 1 (O-mode) |
| State = | 2 (FC) |
| Error = | 0 |
| Packet Type = | 17 (UO0) |
| Compressed Header Size = | 3 |
| Original Header Size = | 40 |
| RTP SN = | 139 |
| RTP SN Window Size = | 16 |
| Min SN Value in this Window = | 133 |
| Max Sn Value in this Window = | 148 |
| RTP TS = | 83520 |
| RTP TS Scaled = | 261 |
| RTP TS Window Size = | 0 |
| Min Scaled TS in this window = | 0 |
| Max Scaled TS in this window = | 0 |

| 2014 Jun 13 05:58:13.242 [D0] 0x1362 RoHC Decompressor | |
|---|---|
| RoHC Instance = | 4237063872 |
| CID = | 0 |
| Profile = | 1 (RTP) |
| Mode = | 1 (O-mode) |
| State = | 2 (FC) |
| Error = | 0 |
| Packet Type = | 17 (UO0) |
| Compressed Header Size = | 3 |
| Original Header Size = | 40 |
| RTP SN = | 140 |

-continued

2014 Jun 13 05:58:13.242 [D0] 0x1362 RoHC
Decompressor

| | |
|---|---|
| RTP SN Window Size = | 16 |
| Min SN Value in this Window = | 134 |
| Max Sn Value in this Window = | 149 |
| RTP TS = | 83840 |
| RTP TS Scaled = | 262 |
| RTP TS Window Size = | 0 |
| Min Scaled TS in this window = | 0 |
| Max Scaled TS in this window = | 0 |

2014 Jun 13 05:58:13.276 [10] 0xB0A3 LTE PDCP DL Cipher Data PDU
Num PDUs = 4

| | | | | | | | | count | | | | |
|---|---|---|---|---|---|---|---|---|---|---|---|---|
| cfg | sn | | bearer | valid | pdu | | | | | | | |
| PDCPDL | CIPH | DATA | idx | mode | length | id | logged | pdu | size | bytes | sys_fn | sub_fn (hex) | sn | log_buffer (hex) |
| PDCPDL | CIPH | DATA | 4 | UM | 7 bit | 3 | Yes | 37 | 3 | 435 | 9 | 0x89 | 9 | 89 47 23 |
| PDCPDL | CIPH | DATA | 4 | UM | 7 bit | 3 | Yes | 37 | 3 | 435 | 9 | 0x8A | 10 | 8A E1 8C |
| PDCPDL | CIPH | DATA | 4 | UM | 7 bit | 3 | Yes | 37 | 3 | 439 | 9 | 0x8B | 11 | 8B 17 8B |
| PDCPDL | CIPH | DATA | 4 | UM | 7 bit | 3 | Yes | 37 | 3 | 439 | 9 | 0x8C | 12 | 8C 12 35 |

In the exemplary log file shown above, 54 RTP/PDCP packets were lost. Subsequently, four more RTP packets were lost because of ROHC decompression failure. After that, the UE receives an IR packet from the network and data reception begins to pass again. The ROHC decompression failure would not have happened had the method described herein been implemented, as shown below.

The last two successfully received ROHC packets were received at SFN 439.9 as from the illustration above. Thereafter, a huge gap exists until the next ROHC packet is received after 2.36 seconds. The SFN is 675.9 and the prior SFN was 439.9, so that the difference=236 frames.

2014 Jun 13 05:58:15.602 [F3] 0x1362 RoHC
Decompressor

| | |
|---|---|
| RTP TS = | 86080 |
| RTP TS Scaled = | 262 |
| RTP TS Window Size = | 0 |
| Min Scaled TS in this window = | 0 |
| Max Scaled TS in this window = | 0 |

2014 Jun 13 05:58:15.602 [10] 0x1362 RoHC
Decompressor

| | |
|---|---|
| RoHC Instance = | 4237063872 |
| CID = | 0 |
| Profile = | 1 (RTP) |
| Mode = | 1 (O-mode) |
| State = | 1 (SC) |
| Error = | 131073 |
| Packet Type = | 0 (None) |
| Compressed Header Size = | 1 |
| Original Header Size = | 0 |

2014 Jun 13 05:58:15.626 [99] 0xB0A3 LTE PDCP DL Cipher Data PDU
Num PDUs = 2

| | | | | | | | | count | | | | |
|---|---|---|---|---|---|---|---|---|---|---|---|---|
| cfg | sn | | bearer | valid | pdu | | | | | | | |
| PDCPDL | CIPH | DATA | idx | mode | length | id | logged | pdu | size | bytes | sys_fn | sub_fn (hex) | sn | log_buffer (hex) |
| PDCPDL | CIPH | DATA | 4 | UM | 7 bit | 3 | Yes | 37 | 3 | 675 | 9 | 0xC3 | 67 | C3 E0 D4 |
| PDCPDL | CIPH | DATA | 4 | UM | 7 bit | 3 | Yes | 37 | 3 | 675 | 9 | 0xC4 | 68 | C4 61 56 |

The two packets above fail ROHC compression, as indicated below.

2014 Jun 13 05:58:15.602 [F3] 0x1362 RoHC
Decompressor

| | |
|---|---|
| RoHC Instance = | 4237063872 |
| CID = | 0 |
| Profile = | 1 (RTP) |
| Mode = | 1 (O-mode) |
| State = | 1 (SC) |
| Error = | 65537 |
| Packet Type = | 17 (UO0) |
| Compressed Header Size = | 3 |
| Original Header Size = | 0 |
| RTP SN = | 147 |
| RTP SN Window Size = | 16 |
| Min SN Value in this Window = | 135 |
| Max Sn Value in this Window = | 150 |

-continued

2014 Jun 13 05:58:15.602 [10] 0x1362 RoHC
Decompressor

| | |
|---|---|
| RTP SN = | 0 |
| RTP SN Window Size = | 1 |
| Min SN Value in this Window = | 0 |
| Max Sn Value in this Window = | 0 |
| RTP TS = | 0 |
| RTP TS Scaled = | 262 |
| RTP TS Window Size = | 0 |
| Min Scaled TS in this window = | 0 |
| Max Scaled TS in this window = | 0 |

Subsequently, two more ROHC packets received at 679.9 (not shown) failed compression. Then IR packets are received at 683.9 and decompression passes again thereafter, as illustrated below.

2014 Jun 13 05:58:15.726 [51] 0xB0A3 LTE PDCP DL Cipher Data PDU
Num PDUs = 4

| | | | cfg | sn | | bearer | valid | pdu | | count | | | log_buffer | | |
|---|---|---|---|---|---|---|---|---|---|---|---|---|---|---|---|
| PDCPDL | CIPH | DATA | idx | mode | length | id | logged | pdu | size | bytes | sys_fn | sub_fn (hex) | sn (hex) | | |
| PDCPDL | CIPH | DATA | 4 | UM | 7 bit | 3 | Yes | 57 | 3 | 683 | 9 | 0xC7 | 71 C7 C0 A0 | <<-The ROHC IR packet | |
| PDCPDL | CIPH | DATA | 4 | UM | 7 bit | 3 | Yes | 57 | 3 | 683 | 9 | 0xC8 | 72 C8 C4 C3 | | |
| PDCPDL | CIPH | DATA | 4 | UM | 7 bit | 3 | Yes | 57 | 3 | 687 | 9 | 0xC9 | 73 C9 84 4C | | |
| PDCPDL | CIPH | DATA | 4 | UM | 7 bit | 3 | Yes | 57 | 3 | 687 | 9 | 0xCA | 74 CA A1 05 | | |

2014 Jun 13 05:58:15.682 [A1] 0x1362 RoHC
Decompressor <<-The IR packet was successfully decompressed

| | |
|---|---|
| RoHC Instance = | 4237063872 |
| CID = | 0 |
| Profile = | 1 (RTP) |
| Mode = | 1 (O-mode) |
| State = | 2 (FC) |
| Error = | 0 |
| Packet Type = | 41 (IRDYN) |
| Compressed Header Size = | 23 |
| Original Header Size = | 40 |
| RTP SN = | 199 |
| RTP SN Window Size = | 0 |
| Min SN Value in this Window = | 0 |
| Max Sn Value in this Window = | 0 |
| RTP TS = | 122560 |
| RTP TS Scaled = | 383 |
| RTP TS Window Size = | 0 |
| Min Scaled TS in this window = | 0 |
| Max Scaled TS in this window = | 0 |

The following equations may be used to estimate the correct RTP SN and RTP TS of the failed packets.
For the RTP SN:

$$SN_{RTP,est} = SN_{RTP,sd} + (SN_{PDCP,f} - SN_{PDCP,sd})$$

where
$SN_{PDCP,f}$=PDCP SN of the failed at least one packet;
$SN_{PDCP,sd}$=PDCP SN of the prior successfully decoded packet; and
$SN_{RTP,sd}$=RTP SN of the prior successfully decoded packet.
For the RTP TS:

$$TS_{RTP,est} = TS_{RTP,sd} + \{floor((RT_{PDCP,f} - RT_{PDCP,sd})/20) \times n\} \quad (i)$$

where
$RT_{PDCP,f}$=PDCP receive time of the failed packet;
$RT_{PDCP,sd}$=PDCP receive time of the prior successfully decoded packet;
$TS_{RTP,sd}$=RTP timestamp of the prior successfully decoded packet; and
n is a conversion factor.
Alternatively, for the RTP TS:

$$TS_{RTP,est} = TS_{RTP,sd} + (SN_{RTP,est} - SN_{RTP,sd}) \times t_c \quad (ii)$$

where
$TS_{RTP,sd}$=RTP timestamp of the prior successfully decoded packet;
$SN_{RTP,est}$=the estimated RTP SN of the failed packet;
$SN_{RTP,sd}$=the RTP SN of the prior successfully decoded packet; and
$t_c$=a conversion measure in time.
Equation (ii), above, may be used in cases where the failed packet and last successfully decoded packet are part of the same talk spurt. Equation (i), above, may be used in cases where the failed packet and last successfully decoded packet are not part of the same talk spurt.

Applying these equations to the above example, from the successfully decoded packets illustrated above the correct RTP SN and the RTP TS of the failed packets would have been as follows:
For the last successfully decoded packet before the gap in SN—
RTP SN=140
RTP TS=83840
PDCP SN=12
PDCP receive time=439.9
For the first failed packet—
PDCP SN=67
PDCP receive time=675.9
Estimated RTP SN=140+(67−12)=195 (exactly matches the correct RTP SN of this packet)
Estimated RTP TS=83840+(6759−4399)×16=121600 (correct RTP TS is 121280 so CRC will fail, thus try +/−20 ms—a value of −20 ms gives the correct RTP TS value as 121600−20*16=121280)
Similarly for the $2^{nd}$ failed packet—
PDCP SN=68
PDCP receive time=675.9
Estimated RTP SN=140+(68−12)=196 (exactly matches the correct RTP SN of this packet)
Estimated RTP TS=83840+(6759−4399)×16=121600
(This is the correct RTP TS)
In summary,

| | RTP SN | RTP TS |
|---|---|---|
| First failed packet | 195 (the difference between PDCP SNs is 4) | 122560 − (4 × 20 × 16) = 121280 RTP TS of RTP packet 199, above |
| Second failed packet | 196 | 122560 − (3 × 20 × 16) = 121600 |

Figure 9:
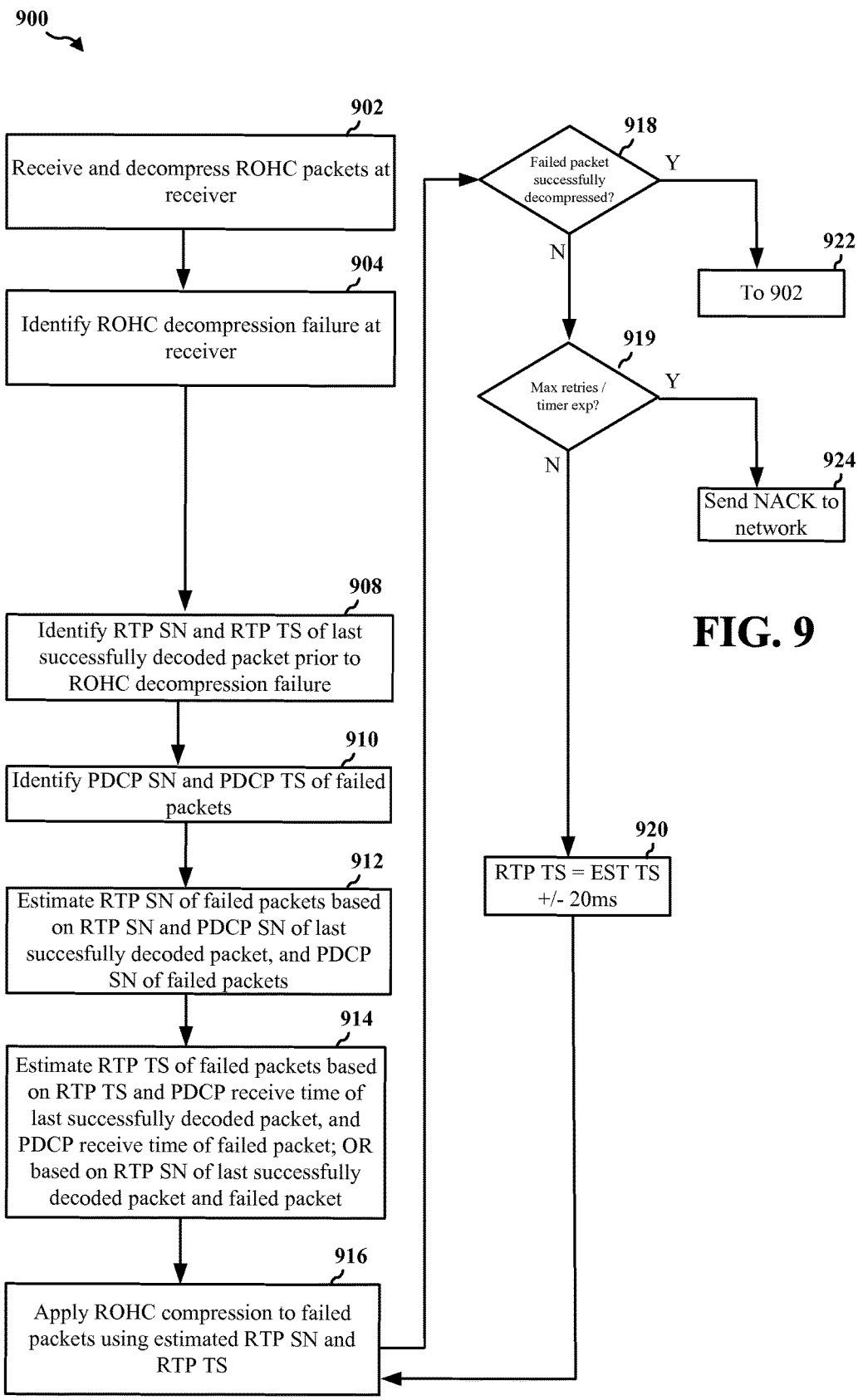
FIG. 9 is a flow chart of a method of wireless communication.

FIG. 9 is a flow chart of a method 900 of wireless communication. The method may be performed by a UE (e.g. the UE 650 of FIG. 6). At 902, ROHC packets are received on a wireless channel and decompressed by the receiver. At 904, an ROHC decompression failure for one or more received packets is identified by the receiver. For the identified failed packets, at 908, the RTP SN and the RTP TS of the last successfully decoded packet are identified. In addition, at 910, the PDCP SN and PDCP TS of the failed packets are identified.

In accordance with the principles enumerated above, at 912, the RTP SN of the failed packets are estimated based on the RTP SN and the PDCP SN of the last successfully decoded packet and the PDCP SN of the failed packets.

Similarly, at 914, the RTP TS of the failed packets is estimated based on the RTP TS and the PDCP receive time of the last successfully decoded packet and the PDCP receive time of the failed packet. In some configurations, the RTP TS of a failed packet may alternatively be estimated based on the RTP SN of the last successfully decoded packet and the RTP SN of the failed packet.

At 916, the receiver applies ROHC compression to the failed packets based on the estimated RTP SN as well as the estimated RTP TS. For a given packet(s) such as the first packet in the stream of failed packets, at 918 the receiver determines whether the failed packet was successfully decompressed based on the estimated values. If so, the decompression process may resume at 902 as normal (922). Otherwise, upon failure, it is determined whether the maximum number of retries has occurred or a timer has expired (919). If not, at 920 a new RTP TS may be estimated based on RTP $TS_{NEW}$=RTP $TS_{EST}$+/−20 ms. Thereupon, ROHC compression is applied to the failed packets using the new estimated values (916), which process 916, 918, 920 may repeat until a threshold is reached or until the packet successfully passes ROHC decompression. At that point, the UE may send a NACK to the network (924).

Figure 10:
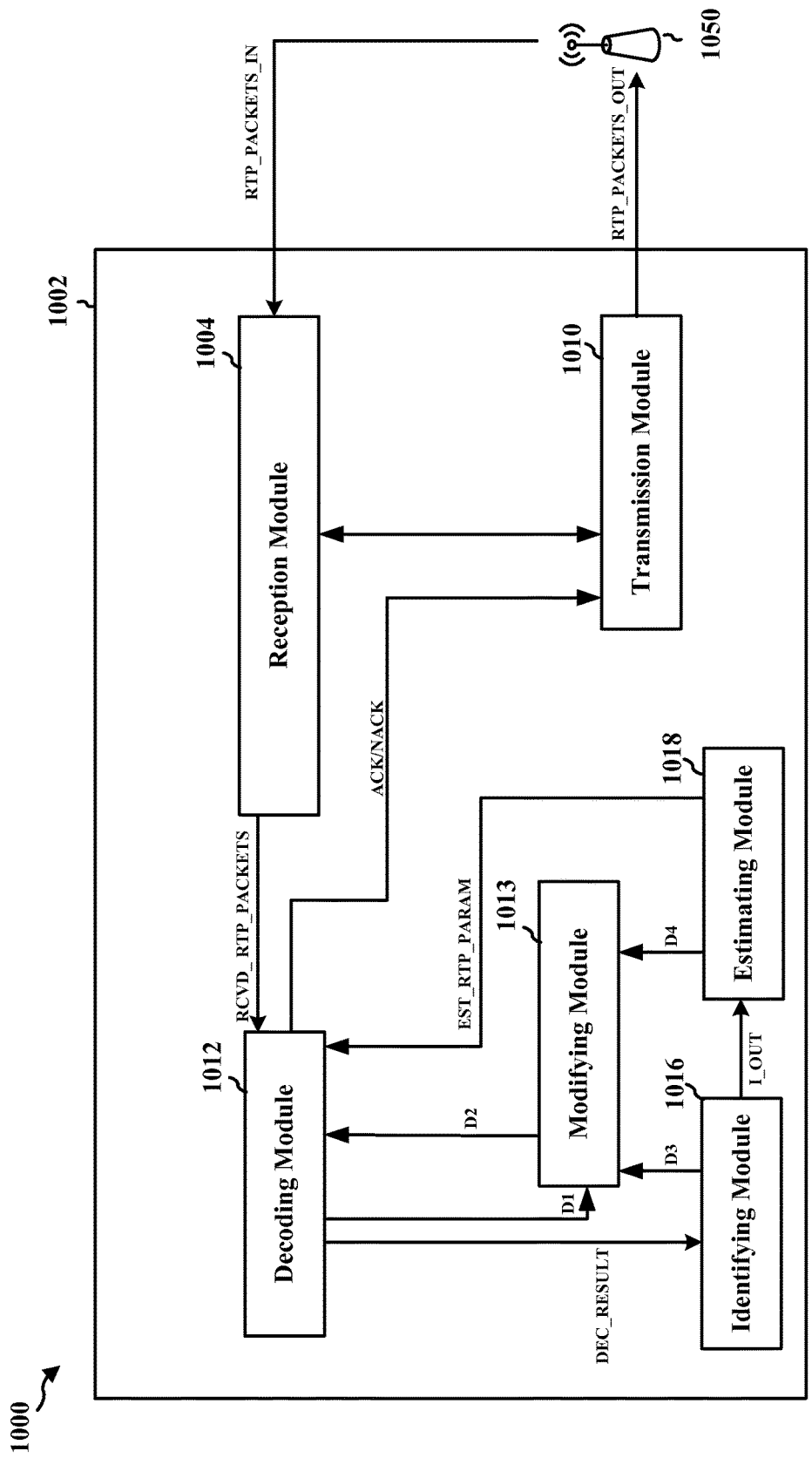
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus may communicate with node 1050, which may be an eNB, via the signal RTP_PACKETS_IN for downlink transmissions from the eNB 1050 to the UE 1002 and via the signal RTP_PACKETS_OUT for uplink transmissions from UE 1002 to eNB 1050.

The apparatus includes a reception module that receives RTP packets from the eNB 1050. The received packets are sent via RCVD_RTP_PACKETS to decoding module 1012 for decoding. Decoding module 1012 sends results for failed packets via DEC_RESULT to identifying module 1016. Identifying module 1016 identifies the PDCP SN and RT of the failed packets. Identifying module provides this information via I_OUT to estimating module 1018. Estimating module 1018 estimates the RTP SN and RTP TS based on the parameters identified by identifying module 1016. Once the RTP SN and RTP TS are estimated, the parameters are returned via EST_RTP_PARAM to decoding module 1012, where ROHC decompression is applied using the estimated values. If ROHC decompression is successful, decoding module 1012 may provide a suitable indication, e.g., to identifying module 1016 via DEC_RESULT. It will be understood that, in addition to performing ROHC decompression, decoding module 1012 may perform other decoding functions for the data packets.

If ROHC decompression at decoding module 1012 fails using the estimated values, decoding module 1012 may inform modifying module 1013 using D1 and identifying module using DEC_RESULT. In such case, identifying module 1016 may provide modifying module 1013 with the identified parameters via D3. Estimating module 1018 may provide modifying module 1013 with the estimated values via D4. Modifying module 1013 may determine a revised RTP TS based on the identified parameters and the estimated values. The revised RTP TS is then sent to decoding module 1012 via D2, wherein ROHC decompression is attempted using the revised RTP TS. Decoding module 1012 may notify modifying module 1013 of subsequent failures or successes of ROHC decompression via D1. The process of revising the RTP TS may continue until ROHC decompression is successful or until a threshold is reached. At the point of failure, decoding module 1012 may send a NACK signal to transmission module 1010 for transmission to eBN 1050.

The apparatus may include additional modules that perform each of the blocks of the algorithm in the aforementioned flow charts of FIGS. 8 and 9. As such, each block in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
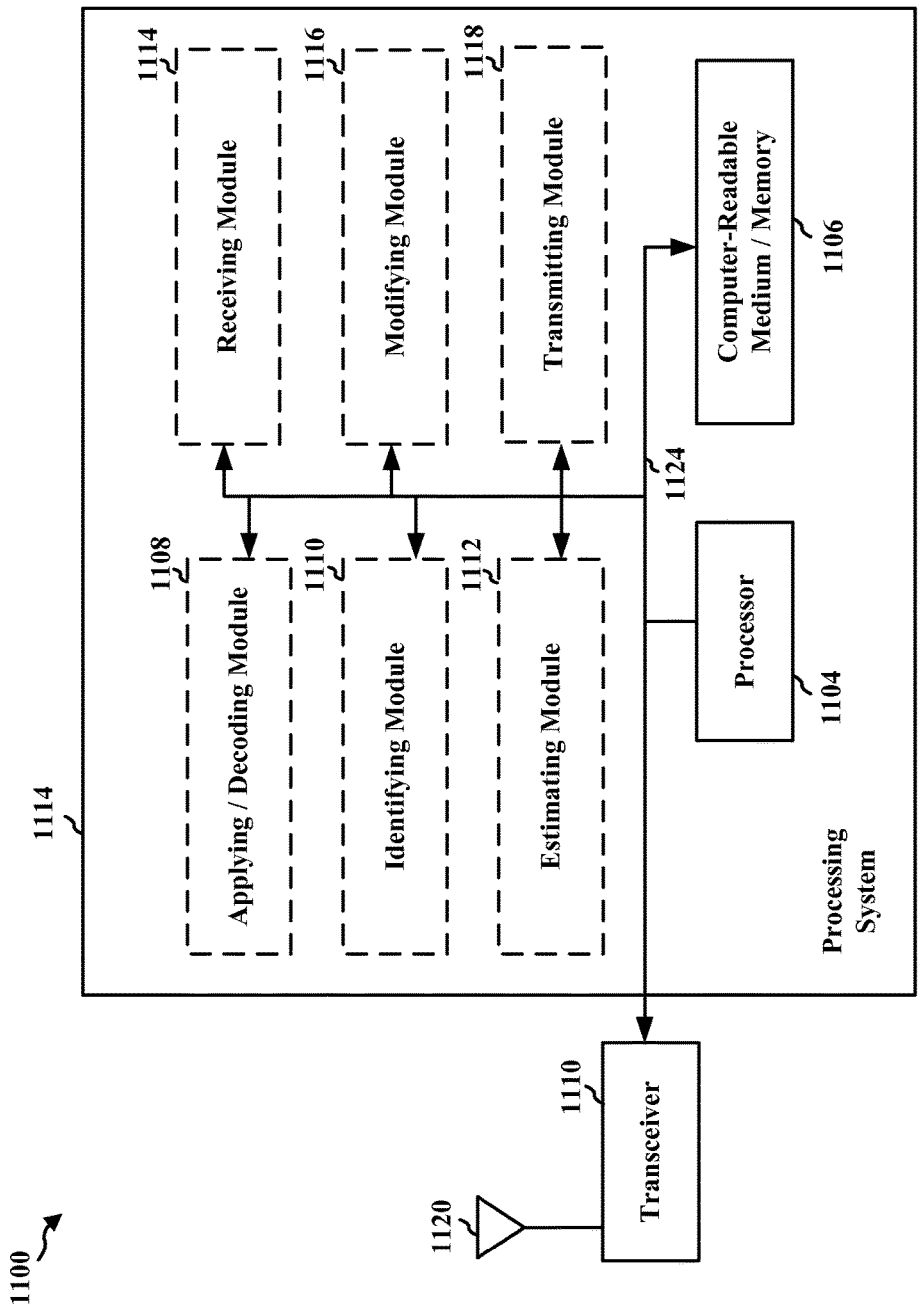
FIG. 11 is a diagram illustrating an example of a hardware implementation for an apparatus employing a processing system.

FIG. 11 is a diagram 1100 illustrating an example of a hardware implementation for an apparatus employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1108, 1110, 1112, 1114, 1116, 1118 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1114. In addition, the transceiver 1110 receives information from the processing system 1114, specifically the transmitting module 1118, and based on the received information, generates a signal to be applied to the one or more antennas 1120.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1108, 1110, 1112, 1114, 1116, 1118. Applying/decoding module 1108 may include applying functions for ROHC decompression as well as the remaining decoding functions for the data packets. The modules may be software modules running in the processor 1104, resident/stored in the computer readable medium/memory 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1100/1100' for wireless communication includes means for receiving a plurality of Real-time Transport (RTP) packets on a wireless channel;

means for applying Robust Header Compression (ROHC) decompression to decode the received RTP packets wherein a decoding failure occurs for at least one of the packets; means for estimating at least one RTP parameter of the failed at least one packet based on a corresponding Packet Data Convergence Protocol (PDCP) parameter; means for decoding the failed at least one packet using the at least one RTP parameter; means for estimating an RTP sequence number (SN) of the failed at least one packet based upon a difference between a PDCP SN of the failed at least one packet and a PDCP SN of a prior successfully decoded packet; means for estimating an RTP timestamp of the failed at least one packet based upon a difference between a PDCP receive time of the failed at least one packet and a PDCP receive time of the prior successfully decoded packet; means for estimating an RTP timestamp of the failed at least one packet based upon a difference between the estimated RTP SN of the failed at least one packet and an RTP SN of the prior successfully decoded packet; means for estimating an RTP timestamp of the failed at least one packet based upon a difference between the estimated RTP SN of the failed at least one packet and an RTP SN of the prior successfully decoded packet, when the failed at least one packet and the prior successfully decoded packet are part of the same talk spurt; means for estimating an RTP timestamp of the failed at least one packet based upon a difference between a PDCP receive time of the failed at least one packet and a PDCP receive time of the prior successfully decoded packet, when the failed at least one packet and the prior successfully decoded packet are not part of the same talk spurt; means for applying ROHC to decode the failed at least one packet using the estimated at least RTP parameter; means for experiencing another decoding failure for the failed at least one packet; means for modifying the estimated RTP timestamp by a predetermined value; means for decoding the failed at least one packet using the modified estimated RTP timestamp; and means for successively modifying the estimated RTP timestamp in predetermined increments until the failed at least one packet is successfully decoded or a threshold is reached.

The aforementioned means may be one or more of the aforementioned modules of the apparatus 1100 and/or the processing system 1114 of the apparatus 1100' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a plurality of Real-time Transport (RTP) packets over a wireless channel, each of the plurality of RTP packets including at least one RTP parameter and at least one Packet Data Convergence Protocol (PDCP) parameter;
   applying Robust Header Compression (ROHC) decompression to decode the received RTP packets wherein a decoding failure occurs for at least one of the packets;
   estimating at least one RTP parameter of the failed at least one packet based on a corresponding PDCP parameter of the at least one PDCP parameter; and
   decoding the failed at least one packet using the at least one estimated RTP parameter.

2. The method of claim 1, wherein the at least one estimated RTP parameter comprises an RTP sequence number (SN) and an RTP timestamp.

3. The method of claim 2, wherein the corresponding PDCP parameter comprises a PDCP SN and a PDCP receive time.

4. The method of claim 1, wherein estimating the at least one RTP parameter comprises estimating an RTP sequence number (SN) of the failed at least one packet based upon a difference between a PDCP SN of the failed at least one packet and a PDCP SN of a prior successfully decoded packet.

5. The method of claim 4, wherein the estimated RTP SN of the failed at least one packet is calculated based on the following equation:

$$SN_{RTP,est} = SN_{RTP,sd} + (SN_{PDCP,f} - SN_{PDCP,sd})$$

where
   $SN_{PDCP,f}$=PDCP SN of the failed at least one packet;
   $SN_{PDCP,sd}$=PDCP SN of the prior successfully decoded packet; and
   $SN_{RTP,sd}$=RTP SN of the prior successfully decoded packet.

6. The method of claim 4, wherein estimating the at least one RTP parameter further comprises estimating an RTP timestamp of the failed at least one packet based upon a difference between a PDCP receive time of the failed at least one packet and a PDCP receive time of the prior successfully decoded packet to generate an estimated RTP timestamp.

7. The method of claim 4, wherein estimating the at least one RTP parameter further comprises estimating an RTP timestamp of the failed at least one packet based upon a difference between the estimated RTP SN of the failed at least one packet and an RTP SN of the prior successfully decoded packet.

8. The method of claim 6, wherein the estimated RTP timestamp of the failed at least one packet is calculated based on the following equation:

$$TS_{RTP,est} = TS_{RTP,sd} + \{floor((RT_{PDCP,f} - RT_{PCDP,sd})/20) \times n\}$$

wherein
 $RT_{PDCP,f}$=PDCP receive time of the failed packet;
 $RT_{PDCP,sd}$=PDCP receive time of the prior successfully decoded packet;
 $TS_{RTP,sd}$=RTP timestamp of the prior successfully decoded packet; and
 n is a conversion factor.

9. The method of claim 7, wherein the estimated RTP timestamp of the failed at least one packet is calculated based on the following equation:

$$TS_{RTP,est} = TS_{RTP,sd} + (SN_{RTP,est} - SN_{RTP,sd}) \times t_c$$

where
 $TS_{RTP,sd}$=RTP timestamp of the prior successfully decoded packet;
 $SN_{RTP,est}$=the estimated RTP SN of the failed packet;
 $SN_{RTP,sd}$=the RTP SN of the prior successfully decoded packet; and
 $t_c$=a conversion measure in time.

10. The method of claim 4, wherein the RTP packets comprise Voice over Long Term Evolution (VoLTE) packets and estimating the at least one RTP parameter further comprises:
 estimating an RTP timestamp of the failed at least one packet based upon a difference between the estimated RTP SN of the failed at least one packet and an RTP SN of the prior successfully decoded packet, when the failed at least one packet and the prior successfully decoded packet are part of the same talk spurt; and
 estimating an RTP timestamp of the failed at least one packet based upon a difference between a PDCP receive time of the failed at least one packet and a PDCP receive time of the prior successfully decoded packet, when the failed at least one packet and the prior successfully decoded packet are not part of the same talk spurt.

11. The method of claim 6, wherein decoding the failed at least one packet using the at least one RTP parameter comprises:
 applying ROHC to decode the failed at least one packet using the estimated at least RTP parameter;
 experiencing another decoding failure for the failed at least one packet;
 modifying the estimated RTP timestamp by a predetermined value to generate a modified estimated RTP timestamp; and
 decoding the failed at least one packet using the modified estimated RTP timestamp.

12. The method of claim 11, wherein decoding the failed at least one packet using the modified estimated RTP timestamp further comprises successively modifying the estimated RTP timestamp in predetermined increments until the failed at least one packet is successfully decoded or a threshold is reached.

13. The method of claim 12, wherein the threshold comprises at least one of an elapsed time and a number of attempts.

14. The method of claim 1, wherein the RTP packets comprise Voice over Long Term Evolution (VoLTE) packets.

15. An apparatus for wireless communication, comprising:
 means for receiving a plurality of Real-time Transport (RTP) packets on a wireless channel, each of the plurality of RTP packets including at least one RTP parameter and at least one Packet Data Convergence Protocol (PDCP) parameter;
 means for applying Robust Header Compression (ROHC) decompression to decode the received RTP packets wherein a decoding failure occurs for at least one of the packets;
 means for estimating at least one RTP parameter of the failed at least one packet based on a corresponding PDCP parameter of the at least one PDCP parameter; and
 means for decoding the failed at least one packet using the at least one estimated RTP parameter.

16. The apparatus of claim 15, wherein the at least one estimated RTP parameter comprises an RTP sequence number (SN) and an RTP timestamp.

17. The apparatus of claim 16, wherein the corresponding PDCP parameter comprises a PDCP SN and a PDCP receive time.

18. The apparatus of claim 15, wherein the means for estimating the at least one RTP parameter comprises means for estimating an RTP sequence number (SN) of the failed at least one packet based upon a difference between a PDCP SN of the failed at least one packet and a PDCP SN of a prior successfully decoded packet.

19. The apparatus of claim 18, wherein the estimated RTP SN of the failed at least one packet is calculated based on the following equation:

$$SN_{RTP,est} = SN_{RTP,sd} + (SN_{PDCP,f} - SN_{PDCP,sd})$$

where
 $SN_{PDCP,f}$=PDCP SN of the failed at least one packet;
 $SN_{PDCP,sd}$=PDCP SN of the prior successfully decoded packet; and
 $SN_{RTP,sd}$=RTP SN of the prior successfully decoded packet.

20. The apparatus of claim 18, wherein the means for estimating the at least one RTP parameter further comprises means for estimating an RTP timestamp of the failed at least one packet based upon a difference between a PDCP receive time of the failed at least one packet and a PDCP receive time of the prior successfully decoded packet to generate an estimated RTP timestamp.

21. The apparatus of claim 18, wherein the means for estimating the at least one RTP parameter further comprises means for estimating an RTP timestamp of the failed at least one packet based upon a difference between the estimated RTP SN of the failed at least one packet and an RTP SN of the prior successfully decoded packet.

22. The apparatus of claim 20, wherein the estimated RTP timestamp of the failed at least one packet is calculated based on the following equation:

$$TS_{RTP,est} = TS_{RTP,sd} + \{floor((RT_{PDCP,f} - RT_{PDCP,sd})/20) \times n\}$$

where
- $RT_{PDCP,f}$=PDCP receive time of the failed packet;
- $RT_{PDCP,sd}$=PDCP receive time of the prior successfully decoded packet;
- $TS_{RTP,sd}$=RTP timestamp of the prior successfully decoded packet; and
- n is a conversion factor.

23. The apparatus of claim 21, wherein the estimated RTP timestamp of the failed at least one packet is calculated based on the following equation:

$$TS_{RTP,est}=TS_{RTP,sd}+(SN_{RTP,est}-SN_{RTP,sd})\times t_c$$

where
- $TS_{RTP,sd}$=RTP timestamp of the prior successfully decoded packet;
- $SN_{RTP,est}$=the estimated RTP SN of the failed packet;
- $SN_{RTP,sd}$=the RTP SN of the prior successfully decoded packet; and
- $t_c$=a conversion measure in time.

24. The apparatus of claim 18, wherein the RTP packets comprise Voice over Long Term Evolution (VoLTE) packets and the means for estimating the at least one RTP parameter further comprises:
  means for estimating an RTP timestamp of the failed at least one packet based upon a difference between the estimated RTP SN of the failed at least one packet and an RTP SN of the prior successfully decoded packet, when the failed at least one packet and the prior successfully decoded packet are part of the same talk spurt; and
  means for estimating an RTP timestamp of the failed at least one packet based upon a difference between a PDCP receive time of the failed at least one packet and a PDCP receive time of the prior successfully decoded packet, when the failed at least one packet and the prior successfully decoded packet are not part of the same talk spurt.

25. The apparatus of claim 20, wherein the means for decoding the failed at least one packet using the at least one RTP parameter comprises:
  means for applying ROHC to decode the failed at least one packet using the estimated at least RTP parameter;
  means for experiencing another decoding failure for the failed at least one packet;
  means for modifying the estimated RTP timestamp by a predetermined value to generate a modified estimated RTP timestamp; and
  means for decoding the failed at least one packet using the modified estimated RTP timestamp.

26. The apparatus of claim 25, wherein the means for decoding the failed at least one packet using the modified estimated RTP timestamp further comprises means for successively modifying the estimated RTP timestamp in predetermined increments until the failed at least one packet is successfully decoded or a threshold is reached.

27. The apparatus of claim 26, wherein the threshold comprises at least one of an elapsed time and a number of attempts.

28. The apparatus of claim 15, wherein the RTP packets comprise Voice over Long Term Evolution (VoLTE) packets.

29. An apparatus for wireless communication, comprising:
  a memory; and
  at least one processor coupled to the memory and configured to:
    receive a plurality of Real-time Transport (RTP) packets over a wireless channel, each of the plurality of RTP packets including at least one RTP parameter and at least one Packet Data Convergence Protocol (PDCP) parameter;
    apply Robust Header Compression (ROHC) decompression to decode the received RTP packets wherein a decoding failure occurs for at least one of the packets;
    estimate at least one RTP parameter of the failed at least one packet based on a corresponding PDCP parameter of the at least one PDCP parameter; and
    decode the failed at least one packet using the at least one estimated RTP parameter.

30. The apparatus of claim 29, wherein the at least one estimated RTP parameter comprises an RTP sequence number (SN) and an RTP timestamp.

31. The apparatus of claim 30, wherein the corresponding PDCP parameter comprises a PDCP SN and a PDCP receive time.

32. The apparatus of claim 29, wherein estimating the at least one RTP parameter comprises estimating an RTP sequence number (SN) of the failed at least one packet based upon a difference between a PDCP SN of the failed at least one packet and a PDCP SN of a prior successfully decoded packet.

33. The apparatus of claim 32, wherein the estimated RTP SN of the failed at least one packet is calculated based on the following equation:

$$SN_{RTP,est}=SN_{RTP,sd}+(SN_{PDCP,f}-SN_{PDCP,sd})$$

where
- $SN_{PDCP,f}$=PDCP SN of the failed at least one packet;
- $SN_{PDCP,sd}$=PDCP SN of the prior successfully decoded packet; and
- $SN_{RTP,sd}$=RTP SN of the prior successfully decoded packet.

34. The apparatus of claim 32, wherein estimating the at least one RTP parameter further comprises estimating an RTP timestamp of the failed at least one packet based upon a difference between a PDCP receive time of the failed at least one packet and a PDCP receive time of the prior successfully decoded packet to generate an estimated RTP timestamp.

35. The apparatus of claim 32, wherein estimating the at least one RTP parameter further comprises estimating an RTP timestamp of the failed at least one packet based upon a difference between the estimated RTP SN of the failed at least one packet and an RTP SN of the prior successfully decoded packet.

36. The apparatus of claim 34, wherein the estimated RTP timestamp of the failed at least one packet is calculated based on the following equation:

$$TS_{RTP,est}=TS_{RTP,sd}+\{floor((RT_{PDCP,f}-RT_{PDCP,sd})/20)\times n\}$$

where
- $RT_{PDCP,f}$=PDCP receive time of the failed packet;
- $RT_{PDCP,sd}$=PDCP receive time of the prior successfully decoded packet;
- $TS_{RTP,sd}$=RTP timestamp of the prior successfully decoded packet; and
- n is a conversion factor.

37. The apparatus of claim 35, wherein the estimated RTP timestamp of the failed at least one packet is calculated based on the following equation:

$$TS_{RTP,est}=TS_{RTP,sd}+(SN_{RTP,est}-SN_{RTP,sd})\times t_c$$

where
- $TS_{RTP,sd}$=RTP timestamp of the prior successfully decoded packet;
- $SN_{RTP,est}$=the estimated RTP SN of the failed packet;

$SN_{RTP,sd}$=the RTP SN of the prior successfully decoded packet; and $t_c$=a conversion measure in time.

38. The apparatus of claim 32, wherein the RTP packets comprise Voice over Long Term Evolution (VoLTE) packets and estimating the at least one RTP parameter further comprises:

estimating an RTP timestamp of the failed at least one packet based upon a difference between the estimated RTP SN of the failed at least one packet and an RTP SN of the prior successfully decoded packet, when the failed at least one packet and the prior successfully decoded packet are part of the same talk spurt; and estimating an RTP timestamp of the failed at least one packet based upon a difference between a PDCP receive time of the failed at least one packet and a PDCP receive time of the prior successfully decoded packet, when the failed at least one packet and the prior successfully decoded packet are not part of the same talk spurt.

39. The apparatus of claim 34, wherein decoding the failed at least one packet using the at least one RTP parameter comprises:

applying ROHC to decode the failed at least one packet using the estimated at least RTP parameter;

experiencing another decoding failure for the failed at least one packet;

modifying the estimated RTP timestamp by a predetermined value to generate a modified estimated RTP timestamp;

decoding the failed at least one packet using the modified estimated RTP timestamp.

40. The apparatus of claim 39, wherein decoding the failed at least one packet using the modified estimated RTP timestamp further comprises successively modifying the estimated RTP timestamp in predetermined increments until the failed at least one packet is successfully decoded or a threshold is reached.

41. The apparatus of claim 40, wherein the threshold comprises at least one of an elapsed time and a number of attempts.

42. The apparatus of claim 29, wherein the RTP packets comprise Voice over Long Term Evolution (VoLTE) packets.

43. A non-transitory computer-readable medium storing computer executable code for wireless communication, comprising code for:

receiving a plurality of Real-time Transport (RTP) packets over a wireless channel, each of the plurality of RTP packets including at least one RTP parameter and at least one Packet Data Convergence Protocol (PDCP) parameter;

applying Robust Header Compression (ROHC) decompression to decode the received RTP packets wherein a decoding failure occurs for at least one of the packets;

estimating at least one RTP parameter of the failed at least one packet based on a corresponding PDCP parameter of the at least one PDCP parameter; and decoding the failed at least one packet using the at least one estimated RTP parameter.

44. The computer-readable medium of claim 43, wherein the at least one estimated RTP parameter comprises an RTP sequence number (SN) and an RTP timestamp.

45. The computer-readable medium of claim 44, wherein the corresponding PDCP parameter comprises a PDCP SN and a PDCP receive time.

46. The computer-readable medium of claim 43, wherein estimating the at least one RTP parameter comprises estimating an RTP sequence number (SN) of the failed at least one packet based upon a difference between a PDCP SN of the failed at least one packet and a PDCP SN of a prior successfully decoded packet.

47. The computer-readable medium of claim 46, wherein the estimated RTP SN of the failed at least one packet is calculated based on the following equation:

$$SN_{RTP,est}=SN_{RTP,sd}+(SN_{PDCP,f}-SN_{PDCP,sd})$$

where $SN_{PDCP,f}$=PDCP SN of the failed at least one packet;
$SN_{PDCP,sd}$=PDCP SN of the prior successfully decoded packet; and
$SN_{RTP,sd}$=RTP SN of the prior successfully decoded packet.

48. The computer-readable medium of claim 46, wherein estimating the at least one RTP parameter further comprises estimating an RTP timestamp of the failed at least one packet based upon a difference between a PDCP receive time of the failed at least one packet and a PDCP receive time of the prior successfully decoded packet to generate an estimated RTP timestamp.

49. The computer-readable medium of claim 46, wherein estimating the at least one RTP parameter further comprises estimating an RTP timestamp of the failed at least one packet based upon a difference between the estimated RTP SN of the failed at least one packet and an RTP SN of the prior successfully decoded packet.

50. The computer-readable medium of claim 48, wherein the estimated RTP timestamp of the failed at least one packet is calculated based on the following equation:

$$TS_{RTP,est}=TS_{RTP,sd}+\{floor((RT_{PDCP,f}-RT_{PDCP,sd})/20)\times n\}$$

where $RT_{PDCP,f}$=PDCP receive time of the failed packet;
$RT_{PDCP,sd}$=PDCP receive time of the prior successfully decoded packet;
$TS_{RTP,sd}$=RTP timestamp of the prior successfully decoded packet; and
n is a conversion factor.

51. The computer-readable medium of claim 49, wherein the estimated RTP timestamp of the failed at least one packet is calculated based on the following equation:

$$TS_{RTP,est}=TS_{RTP,sd}+(SN_{RTP,est}-SN_{RTP,sd})\times t_c$$

where $TS_{RTP,sd}$=RTP timestamp of the prior successfully decoded packet;
$SN_{RTP,est}$=the estimated RTP SN of the failed packet;
$SN_{RTP,sd}$=the RTP SN of the prior successfully decoded packet; and
$t_c$=a conversion measure in time.

52. The computer-readable medium of claim 46, wherein the RTP packets comprise Voice over Long Term Evolution (VoLTE) packets and estimating the at least one RTP parameter further comprises:

estimating an RTP timestamp of the failed at least one packet based upon a difference between the estimated RTP SN of the failed at least one packet and an RTP SN of the prior successfully decoded packet, when the failed at least one packet and the prior successfully decoded packet are part of the same talk spurt; and estimating an RTP timestamp of the failed at least one packet based upon a difference between a PDCP receive time of the failed at least one packet and a PDCP receive time of the prior successfully decoded packet, when the failed at least one packet and the prior successfully decoded packet are not part of the same talk spurt.

53. The computer-readable medium of claim 48, wherein decoding the failed at least one packet using the at least one RTP parameter comprises:
- applying ROHC to decode the failed at least one packet using the estimated at least RTP parameter;
- experiencing another decoding failure for the failed at least one packet;
- modifying the estimated RTP timestamp by a predetermined value to generate a modified estimated RTP timestamp;
- decoding the failed at least one packet using the modified estimated RTP timestamp.

54. The computer-readable medium of claim 53, wherein decoding the failed at least one packet using the modified estimated RTP timestamp further comprises successively modifying the estimated RTP timestamp in predetermined increments until the failed at least one packet is successfully decoded or a threshold is reached.

55. The computer-readable medium of claim 54, wherein the threshold comprises at least one of an elapsed time and a number of attempts.

56. The computer-readable medium of claim 43, wherein the RTP packets comprise Voice over Long Term Evolution (VoLTE) packets.

* * * * *